United States Patent

Hoefle et al.

[15] 3,666,771
[45] May 30, 1972

[54] M-(AMINO-S-TRIAZOLYL)BENZENE-SULFONAMIDES AND THEIR PRODUCTION

[72] Inventors: Milton L. Hoefle; Ann Holmes, both of Ann Arbor, Mich.

[73] Assignee: Parke, David & Company, Detroit, Mich.

[22] Filed: July 6, 1970

[21] Appl. No.: 52,720

[52] U.S. Cl.......................260/308 R, 260/465 D, 260/470, 260/515 A, 260/518 R, 260/518 A, 260/556 AR, 424/232, 424/269
[51] Int. Cl. .......................................................C07d 55/06
[58] Field of Search ..............................................260/308 R

[56] References Cited

UNITED STATES PATENTS 2,989,539   6/1961   Anderson et al.......................260/310

Primary Examiner—Alton D. Rollins
Attorney—Robert R. Adams, David B. Ehrlinger, George M. Richards and Edward J. Gall

[57] ABSTRACT

Amino-s-triazolylbenzenesulfonamides having the formula

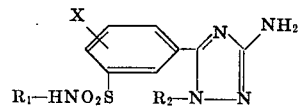

where each of $R_1$ and $R_2$ is hydrogen or methyl, and X is hydrogen, methyl, methoxy, or halogen, and salts thereof are produced by cyclizing a sulfamoylbenzoic acid 2-amidinohydrazide. The compounds of the invention are useful as pharmacological agents having antiviral activity.

10 Claims, No Drawings

M-(AMINO-S-TRIAZOLYL)BENZENE-SULFONAMIDES AND THEIR PRODUCTION

SUMMARY AND DETAILED DESCRIPTION

The present invention relates to new heterocyclic amine compounds that are useful as pharmacological agents and to methods for their production. More particularly, the invention relates to new amino-s-triazolylbenzenesulfonamide compounds having the formula

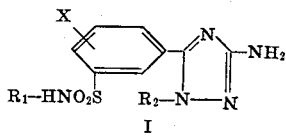

I and to pharmaceutically acceptable salts thereof; where each of $R_1$ and $R_2$ is hydrogen or methyl, and X represents hydrogen, methyl, methoxy, and halogen. Preferred halogens represented by X are chlorine and bromine.

In accordance with the invention, compounds having the foregoing formula and salts thereof are produced by the cyclization of a sulfamoylbenzoic acid 2-amidinohydrazide compound having the formula

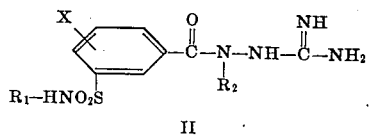

II where each of $R_1$, $R_2$, and X has the aforementioned significance. The cyclization is best accomplished by heating the compound of formula II, in free base form, or preferably, in salt form, in solution in the presence of a base. The temperature and duration are not especially critical and may be varied. It is most convenient to heat the solution containing the chosen starting material and base to the boiling point, and at that temperature, the cyclization is essentially complete after a period of about 5 to 60 minutes. Any of a number of bases may be used to catalyze the cyclization, including alkali metal hydroxides, alkali metal carbonates, alkaline earth metal hydroxides, alkaline earth metal carbonates, ammonia, and tertiary amines, such as pyridine, quinoline, triethylamine, and N,N-dimethylaniline. The preferred bases are an alkali metal hydroxide, especially sodium hydroxide, and ammonia. The preferred solvent for use with the foregoing bases is water, although a number of water-miscible solvents, including lower alkanols, dioxane, tetrahydrofuran, and dimethylsulfoxide, can also be used, either alone or mixed with water. When the starting sulfamoylbenzoic acid 2-amidinohydrazide compound is used in salt form, at least enough base is used to neutralize the salt. The amount of base over and above that required for neutralization of the salt form is not critical. The amino-s-triazolylbenzenesulfonamide product of the reaction can be isolated in the free form having formula I above or in salt form by appropriate adjustment of the pH of the reaction mixture.

The cyclization of the compound of formula II can also be accomplished simply by heating it, in free base form, in solution at an elevated temperature in the absence of any added base. Added base is not strictly required in such a case because the sulfamoylbenzoic acid 2-amidinohydrizide starting material in free base form is sufficiently basic to permit the intramolecular cyclization reaction to proceed to completion. In effecting the cyclization in this way, the same solvents and reaction conditions as those given above may be used, and in addition, the aromatic hydrocarbons benzene and toluene may also be used as solvent. If benzene and toluene are used, the course of the cyclization can be determined by heating the reaction mixture to boiling and collecting and measuring the water that is given off as a by-product of the reaction.

The sulfamoylbenzoic acid 2-amidinohydrazide compounds of formula II and salts thereof that are used as starting materials in the foregoing process are prepared by reacting a sulfamoylbenzoic acid hydrazide compound having the formula

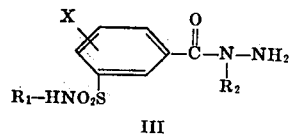

III with an acid-addition salt of a reactive guanidine compound, which is preferably 3,5-dimethylpyrazole-1-carboxamidine nitrate. While the sulfamoylbenzoic acid 2-amidinohydrazide starting material can be isolated, preferably in salt form, prior to cyclization, it is more convenient and preferable to prepare this starting material in situ, in nitrate salt form, when 3,5-dimethylpyrazole-1-carboxamidine nitrate is used in the reaction with the hydrazide of formula III, and then react it further with base in the cyclization process described above without isolation.

The sulfamoylbenzoic acid hydrazide intermediates of formula III above are prepared by the following general method. A benzoic acid compound having the formula

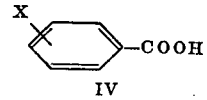

IV is reacted with chlorosulfonic acid to give a chlorosulfonylbenzoic acid compound having the formula

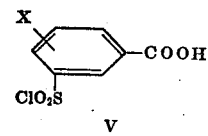

V which is next reacted with ammonia or methylamine, and the sulfamoylbenzoic acid intermediate product, having the formula,

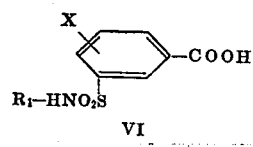

VI is in turn reacted either with methanol in the presence of hydrogen chloride to give a sulfamoylbenzoic acid, methyl ester, having the formula,

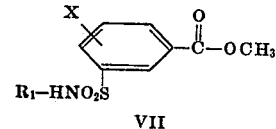

VII or with chloroacetonitrile in the presence of triethylamine to give a sulfamoylbenzoic acid, cyanomethyl ester, having the formula,

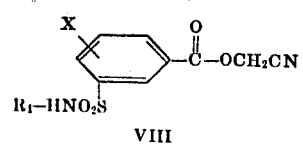

VIII and either of the two intermediate esters is finally reacted with hydrazine or with monomethyl hydrazine to give the desired sulfamoylbenzoic acid hydrazide intermediate having formula III. In formulas IV, V, VI, VII, and VIII, each of $R_1$ and X has the same meaning as previously given.

The compounds of the invention can exist in the free form having formula I above or in salt form. Pharmaceutically acceptable acid-addition salts are formed as described above or by reaction of the free amino-s-triazolylbenzenesulfonamide compounds with any of a number of inorganic and organic acids, including hydrochloroic, hydrobromic, hydriodic, nitric, sulfuric, phosphoric, acetic, benzoic, salicylic, methane-sulfonic, benzenesulfonic, succinic, maleic, tartaric, and citric acids. Pharmaceutically-acceptable salts are also formed by reacting the free amino-s-triazolylbenzenesulfonamides with a strong base. Suitable strong bases for this purpose include alkali metal hydroxides, such as sodium hydroxide, potassium hydroxide, and lithium hydroxide; alkali metal hydrides, such as sodium hydride; alkali metal alkoxides; and alkaline earth metal hydroxides. The free amino-s-triazolylbenzenesulfonamide compounds and their salts may differ somewhat in certain physical properties, such as solubility in polar solvents, but they are otherwise equivalent for purposes of the invention.

The compounds of the invention can also exist in anhydrous form as well as in solvated, including hydrated, forms. In general, the hydrated forms and the solvated forms with pharmaceutically-acceptable solvents are equivalent to the anhydrous or unsolvated form for the purposes of the invention.

The compounds of the invention are new chemical compounds that are useful as pharmacological agents, especially as antiviral agents. As such, they have been found to be active against a number of different viruses, including Coxsackie and polio viruses, as well as various strains of rhinovirus.

The antiviral activity of the compounds of the invention can be demonstrated in and quantitatively measured by a test that utilizes the method of Rightsel, et al. [J. Immunol., Vol. 76, pages 464–474 (1956); Univ. Mich. Med. Bull., Vol. 24, pages 222–234 (1958)] and is carried out in vinyl plastic panels with a monolayer of H. Ep. No. 2 cells. In this test, the effect of a test compound on the host cell and on the cytopathic effect (CPE) of the virus, which is present at a level that is 32 times the 50 percent tissue culture infective dose (32 $TCID_{50}$), is evaluated microscopically and expressed numerically by what is termed the "virus rating" (VR). The VR is a measure of the inhibition of the virus CPE by the test compound at levels that are nontoxic or partially toxic for the host cells. The calculation of the VR for a given test compound is carried out as follows. (See also Ehrlich et. al., Ann N.Y. Acad. Sci., Vol. 130, pages 5–16, especially page 7, 1965.)

Each test compound is normally evaluated in triplicate panels at five levels: undiluted and at dilutions of 3.2-fold, 10-fold, 32-fold, and 100-fold. The value assigned to the CPE of the treated infected cells at each test level is subtracted from that of the untreated but infected controls, and the differences (C–T) for all levels are summed up. If the test compound is partially toxic for the host cell at any test level, the difference (C–T) for that level is halved before being included in the summation. The VR is then finally arrived at by dividing the summation by 10. A VR of 1.0 or greater is considered an indication of antiviral activity.

The virus ratings obtained for some representative compounds of the present invention when tested by the method described above against Coxsackie, polio, and rhinovirus 1A viruses are presented in the following table.

| Compound | Virus Rating, against | | |
|---|---|---|---|
| | Coxsackie | Rhinovirus 1A | Polio |
| m-(5-amino-s-triazol-3-yl)-N-methyl-benzenesulfonamide | Not tested | 1.6 | Not tested |
| 5-(5-amino-s-triazol-3-yl)-2 chlorobenzenesulfonamide | 2.4 | 2.2 | 3.6 |
| 5-(3-amino-1-methyl-s-triazol-5-yl)-2-chloro-N-methyl-benzenesulfonamide | 1.7 | 2.4 | 1.6 |
| 5-(5-amino-s-triazol-3-yl)-2-bromobenzenesulfonamide | 3.7 | 2.4 | 2.9 |
| 5-(5-amino-s-triazol-3-yl)-2-bromo-N-methylbenzene-sulfonamide | 4.6 | 3.4 | 5.8 |
| 3-(5-amino-s-triazol-3-yl)-4-bromo-N-methylbenzene-sulfonamide | 2.0 | 1.7 | 3.9 |

The invention is illustrated by the following examples.

Example 1

A mixture of 21.7 g. of 3-(methylsulfamoyl)benzoic acid hydrazide, 20 g. of 3,5-dimethylpyrazole-1-carboxamidine nitrate, and 100 ml. of water is heated under reflux for 18 hours and then allowed to cool to room temperature. To the reaction mixture, which contains the nitrate salt of 3-(methylsulfamoyl)benzoic acid 2-amidinohydrazide, is added 5 ml. of 50 percent aqueous sodium hydroxide, and the resulting mixture is heated to the boiling point and cooled. The cooled alkaline mixture is neutralized with glacial acetic acid, and upon standing, there is obtained a solid precipitate of m-(5-amino-s-triazol-3-yl)-N-methylbenzenesulfonamide, which is isolated and purified by crystallization from water; m.p. 202°–203° C.

The 3-(methylsulfamoyl)benzoic acid hydrazide starting material is obtained as follows. To 1.3 liters of chlorosulfonic acid, stirred at room temperature, is added in portions 244.3 g. of benzoic acid, and the resulting mixture is heated at 120°–125°C. until hydrogen chloride evolution ceases. The mixture is then cooled and treated with excess ice water, and the colorless solid 3-chlorosulfonylbenzoic acid that precipitates is isolated and used in the next step without further purification. To 1 liter of 40 percent aqueous methylamine, stirred at 0° C., is carefully added 440 g. of 3-chlorosulfonylbenzoic acid, and the resulting mixture is kept at room temperature overnight. It is then acidified with hydrochloric acid, and upon cooling, there is obtained a solid precipitate of 3-(methylsulfamoyl)benzoic acid, which is isolated, washed with cold water, and dried under reduced pressure; m.p. 205°–208°C. Into a mixture of 408.8 g. of 3-(methylsulfamoyl)benzoic acid and 2 liters of methanol at room temperature is bubbled anhydrous hydrogen chloride for one hour. The resulting clear solution is then heated under reflux for one hour more and evaporated to dryness under reduced pressure to give a solid residue of 3-(methylsulfamoyl)benzoic acid, methyl ester, which is isolated and used in the next reaction step without further purification. To a stirred mixture of 435.1 g. of 3-(methylsulfamoyl)-benzoic acid, methyl ester and 2 liters of methanol is added 600 ml. of 85 percent hydrazine hydrate, and the resulting mixture is heated under reflux for about 18 hours and then evaporated under reduced pressure. The residue is treated with water, and the aqueous mixture is neutralized with hydrochloric acid to give, upon cooling, a solid precipitate of 3-(methylsulfamoyl)benzoic acid hydrazide; m.p. 135°–138° C., following crystallization from water and drying under reduced pressure.

Example 2

A mixture consisting of 39.1 g. of 4-chloro-3-sulfamoyl-benzoic acid hydrazide, 31.5 g. of 3,5-dimethylpyrazole-1-carboxamidine nitrate, and 50 ml. of water is heated under reflux for 5 hours, cooled to room temperature, and made alkaline (pH approximately 9) with ammonium hydroxide. The resulting alkaline mixture is chilled, and the solid 4-chloro-3-sulfamoylbenzoic acid 2-amidinohydrazide that precipitates is isolated and crystallized from a mixture of 100 ml. of water and 15 ml. of concentrated hydrochloric acid to give the hydrochloride salt of 4-chloro-3-sulfamoylbenzoic acid 2-amidinohydrazide; m.p. 259°–261°C. This salt is added to a mixture of 500 ml. of water and 10 ml. of 50 percent aqueous sodium hydroxide, and the resulting mixture is heated to the boiling point, cooled, and neutralized with glacial acetic acid. The neutralized mixture is then chilled further, and the solid precipitate of 5-(5-amino-s-triazol-3-yl)-2-chlorobenzene-sulfonamide that is obtained is isolated and purified by crystallization from aqueous ethanol; m.p. 285°–286° C.

A solution of 1.0 g. of 5-(5-amino-s-triazol-3-yl)-2-chlorobenzenesulfonamide in 75 ml. of ethanol is treated with activated charcoal, filtered, and to the filtrate is added 2 ml. of ethyl acetate saturated with hydrogen chloride. The resulting mixture is concentrated by boiling in an open flask to a volume of 15 ml. During the heating, 1.0 ml. more of saturated hydrogen chloride in ethyl acetate solution is added. Upon cooling, there is obtained a solid precipitate of 5-(5-amino-s-triazol-3-yl)-2-chlorobenzene-sulfonamide hydrochloride; m.p. 289°–291° C.

Example 3

A mixture consisting of 27.5 g. of 4-chloro-3-(methylsulfamoyl)benzoic acid 1-methylhydrazide, 20 g. of 3,5-dimethylpyrazole-1-carboxamidine nitrate, and 100 ml. of water is heated under reflux for 18 hours and then cooled to room temperature. To the reaction mixture, which contains the nitrate salt of 4-chloro-3-(methylsulfamoyl)-benzoic acid 2-amidino-1-methylhydrazide, is added 5 ml. of 50 percent aqueous sodium hydroxide, and the resulting mixture is heated to the boiling point, cooled, and neutralized with glacial acetic acid. Upon standing, 5-(3-amino-1-methyl-s-triazol-5-yl)-2-chloro-N-methylbenzenesulfonamide separates from the neutral mixture as an oil, which is isolated and purified by crystallization from ethanol; m.p. 196°–197° C.

The 4-chloro-3-(methylsulfamoyl)benzoic acid 1-methylhydrazide is prepared as follows. A solution of 10.0 g. of 4-chloro-3-(methylsulfamoyl)benzoic acid cyanomethyl ester in 50 ml. of monomethylhydrazine is kept at room temperature for 6 hours and diluted with an equal volume of 25 percent aqueous acetic acid, and the solid 4-chloro-3-(methylsulfamoyl)-benzoic acid 1-methylhydrazide that precipitates is isolated and dried. It is suitable for use without further purification.

Example 4

A mixture consisting of 36.1 g. of 4-bromo-3-sulfamoylbenzoic acid hydrazide, 25 g. of 3,5-dimethylpyrazole-1-carboxamidine nitrate, and 200 ml. of water is heated under reflux for 18 hours and then cooled to room temperature. The reaction mixture, which contains the nitrate salt of 4-bromo-3-sulfamoylbenzoic acid 2-amidinohydrazide, is made alkaline with ammonium hydroxide, and the alkaline mixture is briefly heated at the boiling point, cooled, and neutralized with glacial acetic acid. Upon further cooling, there is obtained from the neutral mixture a solid precipitate of 5-(5-amino-s-triazol-3-yl)-2-bromobenzenesulfonamide, which is isolated and purified by crystallization from water; m.p. 295°–296°C.

A solution of 3.2 g. of 5-(5-amino-s-triazol-3-yl)-2-bromobenzenesulfonamide in 75 ml. of methanol is treated with activated charcoal, filtered, and to the filtrate is added a solution of 1.1 g. of sodium methoxide in 25 ml. of methanol. After 30 minutes at room temperature, the mixture is concentrated to half-volume, cooled, and slowly poured with stirring into ether to give a colorless solid precipitate of 5-(5-amino-s-triazol-3-yl)-2-bromobenzenesulfonamide, monosodium salt, which is isolated and dried.

Example 5

A mixture consisting of 30.8 g. of 4-bromo-3-(methylsulfamoyl)benzoic acid hydrazide, 20 g. of 3,5-dimethylpyrazole-1-carboxamidine nitrate, and 100 ml. of water is heated under reflux for 18 hours and then cooled to room temperature. To the reaction mixture, which contains the nitrate salt of 4-bromo-3-(methylsulfamoyl)benzoic acid 2-amidinohydrazide, is added 5 ml. of 50 percent aqueous sodium hydroxide, and the resulting mixture is briefly heated at the boiling point, cooled, and neutralized with glacial acetic acid. The oily residue that separates is isolated and triturated with ethanol to give solid 5-(5-amino-s-triazol-3-yl)-2-bromo-N-methylbenzenesulfonamide; m.p. 240°–242° C., following crystallization from ethanol.

The 4-bromo-3-(methylsulfamoyl)benzoic acid hydrazide starting material is obtained as follows. Anhydrous hydrogen chloride is bubbled into a mixture of 73.4 g. of 4-bromo-5-(methylsulfamoyl)benzoic acid and 300 ml. of methanol at room temperature for 30 minutes, and the resulting mixture is heated under reflux for 30 minutes more. The reaction mixture is then evaporated to dryness under reduced pressure to give a solid residue of 4-bromo-3-(methylsulfamoyl)benzoic acid, methyl ester; m.p. 170° C. A mixture consisting of 77 g. of this ester intermediate, 70 ml. of 85 percent hydrazine hydrate, and 200 ml. of methanol is heated under reflux for 2 hours and is then evaporated to dryness under reduced pressure to give a solid residue of 4-bromo-3-(methylsulfamoyl)benzoic acid hydrazide, which is washed with cold water and purified by crystallization from water; m.p. 98°–100° C.

Example 6:

A mixture consisting of 30.8 g. of 2-bromo-5-(methylsulfamoyl)benzoic acid hydrazide, 20 g. of 3,5-dimethylpyrazole-1-carboxamidine nitrate, and 100 ml. of water is heated under reflux for 18 hours and then cooled to room temperature. The viscous oil that separates, which is the nitrate salt of 2-bromo-5-(methylsulfamoyl)benzoic acid 2-amidinohydrazide, is isolated by decantation and mixed with 15 ml. of 50 percent aqueous sodium hydroxide and 100 ml. of water, and the resulting mixture is heated under reflux for 5 minutes. Upon cooling, it is treated with sufficient acetic acid to render it just slightly alkaline, and the gummy precipitate of 3-(5-amino-s-triazol-3-yl)-4-bromo-N-methylbenzenesulfonamide that is obtained is isolated and purified by crystallization from 50 percent aqueous ethanol; m.p. 237°–238° C.

The 2-bromo-5-(methylsulfamoyl)benzoic acid hydrazide starting material is obtained as follows. Anhydrous hydrogen chloride is bubbled into a mixture of 147 g. of 2-bromo-5-(methylsulfamoyl)benzoic acid and 500 ml. of methanol at room temperature for 30 minutes, and the resulting mixture is heated under reflux for 30 minutes more. The reaction mixture is then evaporated to dryness under reduced pressure to give a solid residue of 2-bromo-5-(methylsulfamoyl)benzoic acid, methyl ester, which is suitable for use without further purification. To a stirred mixture of 154 g. of this ester intermediate and 500 ml. of methanol is added 130 ml. of 85 percent hydrazine hydrate, and the resulting mixture is heated under reflux for 3.5 hours, cooled, and evaporated under reduced pressure. The residue is mixed with water, and the aqueous mixture is chilled to give solid 2-bromo-5-(methylsulfamoyl-benzoic acid hydrazide; m.p. 175°–176°C., following crystallization from water and drying under reduced pressure.

Example 7

A mixture consisting of 23.8 g. of 4-methyl-3-(methylsulfamoyl)benzoic acid hydrazide, 20 g. of 3,5-dimethylpyrazole-1-carboxamidine nitrate, and 100 ml. of water is heated under reflux for 18 hours, filtered while hot to remove insoluble material, and then cooled to room temperature. To the reaction mixture, which contains the nitrate salt of 4-methyl-3-(methylsulfamoyl)benzoic acid 2-amidinohydrazide, is added 16 g. of sodium hydroxide, and the resulting strongly alkaline solution is heated under reflux for 5 minutes. It is then treated with activated charcoal and filtered, and to the filtrate is added 7 ml. of acetic acid. Upon standing, there is obtained from the acidified filtrate a solid precipitate of 5-(5-amino-s-triazol-3-yl)-N-methyl-o-toluene-sulfonamide, which is isolated and purified by crystallization from aqueous ethanol; m.p. 228°–229° C.

The 4-methyl-3-(methylsulfamoyl)benzoic acid hydrazide starting material is obtained as follows. Anhydrous hydrogen chloride is bubbled into a mixture of 86.0 g. of 3-(methylsulfamoyl)-p-toluic acid and 300 ml. of methanol at room temperature for 30 minutes, and the resulting mixture is heated under reflux for 30 minutes more. The reaction mixture is then evaporated to dryness under reduced pressure to give a residue of 3-(methylsulfamoyl)-p-toluic acid, methyl ester; m.p. 125°–127° C., following trituration with cold water. To a stirred mixture of 86.6 g. of this ester intermediate and 300 ml. of methanol at room temperature is added 75 ml. of 85 percent hydrazine hydrate, and the resulting mixture is heated under reflux for about 18 hours. It is then evaporated under reduced pressure, and the residue is dissolved in water. The aqueous solution is treated with activated charcoal and filtered, and the filtrate is acidified with hydrochloric acid to about pH 4. Upon cooling, there is obtained from the acidic filtrate a solid precipitate of 3-(methylsulfamoyl)-p-toluic acid hydrazide; m.p. 135°–137° C.

Example 8

A mixture consisting of 25.9 g. of 4-methoxy-3-(methylsulfamoyl)benzoic acid hydrazide, 20 g. of 3,5-dimethylpyrazole- 1-carboxamidine nitrate, and 100 ml. of water is heated under reflux for 18 hours and then cooled to room temperature. To the reaction mixture, which contains the nitrate salt of 4-methoxy-3-(methylsulfamoyl)benzoic acid 2-amidinohydrazide, is added 10 ml. of 50 percent aqueous sodium hydroxide, and the resulting mixture is briefly heated at the boiling point, cooled, and neutralized with glacial acetic acid. Upon standing, there is obtained from the neutralized mixture a solid precipitate of 3-(5-amino-s-triazol-3-yl)-6-methoxy-N-methylbenzenesulfonamide; m.p. 230°–232° C., following crystallization from water.

The 4-methoxy-3-(methylsulfamoyl)benzoic acid hydrazide starting material is obtained as follows. Anhydrous hydrogen chloride is bubbled into a mixture of 73.5 g. of 4-methoxy-3-(methylsulfamoyl)benzoic acid and 300 ml. of methanol at room temperature for 30 minutes, and the resulting mixture is heated under reflux for 30 minutes more. The reaction mixture is then evaporated to dryness under reduced pressure to give a solid residue of 4-methoxy-3-(methylsulfamoyl)benzoic acid, methyl ester; m.p. 125°–127°C. To a mixture of 77.7 g. of this ester intermediate and 300 ml. of methanol is added 120 ml. of 85 percent hydrazine hydrate, and the resulting mixture is heated under reflux for 12 hours, cooled, and evaporated under reduced pressure. To the residue is added a small amount of cold water, and the aqueous mixture is filtered to give 4-methoxy-3-(methylsulfamoyl)benzoic acid hydrazide, which is dried under reduced pressure and purified by crystallization from water; m.p. 175°–176°C.

We claim:

1. A member of the class consisting of amino-s-triazolylbenzenesulfonamide compounds having the formula

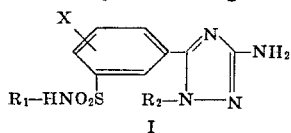

I and pharmaceutically-acceptable salts thereof; where each of $R_1$ and $R_2$ is hydrogen or methyl, and X represents a member of the class consisting of hydrogen, methyl, methoxy, and halogen.

2. A compound according to claim 1 which is m-(5-amino-s-triazol-3-yl(-N-methylbenzenesulfonamide.

3. A compound according to claim 1 which is 5-(5-amino-s-triazol-3-yl)-2-chlorobenzenesulfonamide.

4. A compound according to claim 1 which is 5-(3-amino-1-methyl-s-triazol-5-yl)-2-chloro-N-methylbenzene-sulfonamide.

5. A compound according to claim 1 which is 5-(5-amino-s-triazol-3-yl)-2-bromobenzenesulfonamide.

6. A compound according to claim 1 which is 5-(5-amino-s-triazol-3-yl)-2-bromo-N-methylbenzenesulfonamide.

7. A compound according to claim 1 which is 3-(5-amino-s-triazol-3-yl)-4-bromo-N-methylbenzenesulfonamide.

8. Process for the production of a member of the class consisting of amino-s-triazolylbenzenesulfonamide compounds having the formula

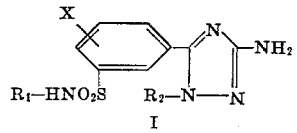

I and salts thereof, which comprises cyclizing a member of the class consisting of sulfamoylbenzoic acid 2-amidino-hydrazide compounds having the formula

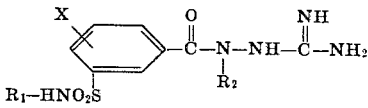

and acid-addition salts thereof; where each of $R_1$, $R_2$, and X is defined as in claim 1.

9. Process according to claim 8 wherein the cyclization is accomplished by heating the sulfamoylbenzoic acid 2-amidinohydrazide, in acid-addition salt form, with a base.

10. Process according to claim 8 wherein the cyclization is accomplished by heating the sulfamoylbenzoic acid 2-amidinohydrazide, in acid-addition salt form, with an aqueous alkali metal hydroxide.

* * * * *